United States Patent
Givoly

(10) Patent No.: US 8,160,997 B1
(45) Date of Patent: Apr. 17, 2012

(54) SYSTEM, METHOD AND COMPUTER PROGRAM PRODUCT FOR MANAGING AGING DATA IN A DATABASE SCHEMA

(75) Inventor: Tal Givoly, Cupertino, CA (US)

(73) Assignee: Amdoes Software Systems Limted, Dublin (IE)

( * ) Notice: Subject to any disclaimer, the term of this patent is extended or adjusted under 35 U.S.C. 154(b) by 586 days.

(21) Appl. No.: 11/739,630

(22) Filed: Apr. 24, 2007

(51) Int. Cl.
*G06F 17/30* (2006.01)

(52) U.S. Cl. ....................... 707/601

(58) Field of Classification Search .............. None
See application file for complete search history.

(56) References Cited

U.S. PATENT DOCUMENTS

| | | | |
|---|---|---|---|
| 5,561,798 A * | 10/1996 | Haderle et al. | 707/682 |
| 6,233,573 B1 * | 5/2001 | Bair et al. | 707/3 |
| 6,542,895 B1 * | 4/2003 | DeKimpe et al. | 1/1 |
| 6,684,206 B2 | 1/2004 | Chen et al. | 707/3 |
| 6,778,996 B2 | 8/2004 | Roccaforte | 707/104 |
| 7,076,491 B2 * | 7/2006 | Tsao | 1/1 |
| 7,124,146 B2 * | 10/2006 | Rjaibi et al. | 707/698 |
| 7,165,065 B1 * | 1/2007 | Welton et al. | 1/1 |
| 2003/0101190 A1 * | 5/2003 | Horvitz et al. | 707/100 |
| 2004/0122646 A1 * | 6/2004 | Colossi et al. | 703/22 |
| 2004/0215626 A1 * | 10/2004 | Colossi et al. | 707/100 |
| 2005/0108204 A1 | 5/2005 | Gordon | 707/3 |
| 2006/0020619 A1 | 1/2006 | Netz et al. | 707/102 |

OTHER PUBLICATIONS

"Programming in Emacs Lisp", Chapter 11. Igar Rayak. 2004, http://www.cs.huji.ac.il/~osigor/emacs/elisp-help/elisp-intro/elisp-intro.html#SEC_Top.*
'Applied Microsoft Analysis Service 2005. by Teo Lachev, 2005, pp. 1-686 (specifically pp. 158 and 322 are attaached). http://books.google.com/books?id=bATOzjQmhlgC&pg=PA158&lpg=PA158dq=removing+dimension+empty&source=bl&ots=LYZ7iFUiVN&sig=hEq6ysia_zlcC6JBAYHiuPrVrfs&hl=en&ei=taOTTeqsHO6C0QHb793MBw&sa=X&oi=book_result&ct=result&resnum=1&ved=.*
Peterson, Steve, "Star Schema", http://c2.com/ppr/starts.html.
Utley, Craig, "Designing the Star Schema Database", http://www.ciobriefings.com/whitepapers/StarSchema.asp.
Ballard, Chuck et al, "Dimensional Modeling: In a Business Intelligence Environment", ibm.com/redbooks.

\* cited by examiner

*Primary Examiner* — Neveen Abel Jalil
*Assistant Examiner* — Kellye Buckingham
(74) *Attorney, Agent, or Firm* — Zilka-Kotab, PC

(57) ABSTRACT

A system, method and computer program product are provided for managing aging data in a database. In use, data, or a dimension in a dimension table is identified in a database. Further, an attribute is stored in association with the data, or the dimension. To this end, at least a portion of the data or the dimension is removed from the database, utilizing the attribute.

20 Claims, 6 Drawing Sheets

100

SYSTEM, METHOD AND COMPUTER PROGRAM PRODUCT FOR MANAGING AGING DATA IN A DATABASE SCHEMA

FIELD OF THE INVENTION

The present invention relates to database schemas, and more particularly to managing data in a database schema.

BACKGROUND

Databases are typically relied upon to store large amounts of data. One exemplary type of database system includes the On-Line Analytical Processing (OLAP) database system. A multi-dimensional OLAP database system has multiple dimensions and members within the dimensions. The data for these dimensions and members may be stored in a table. In use, when these dimensions are changed, data in the table is modified.

Over time as the OLAP database system is relied upon to continuously store more and more data, the resources of the OLAP database system eventually become strained (e.g. data volume threatens to exceed system resources, dimension table size becomes unmanageable, etc.). Moreover, any attempt to remove older data requires significant effort (e.g. data reloading, etc.).

There is thus a need for more effectively managing aging data and/or other related issues associated with the prior art.

SUMMARY

A system, method and computer program product are provided for managing aging data in a database. In use, data, or a dimension in a dimension table is identified in a database. Further, an attribute is stored in association with the data, or the dimension. To this end, at least a portion of the data or the dimension is removed from the database, utilizing the attribute.

DETAILED DESCRIPTION

Figure 1:
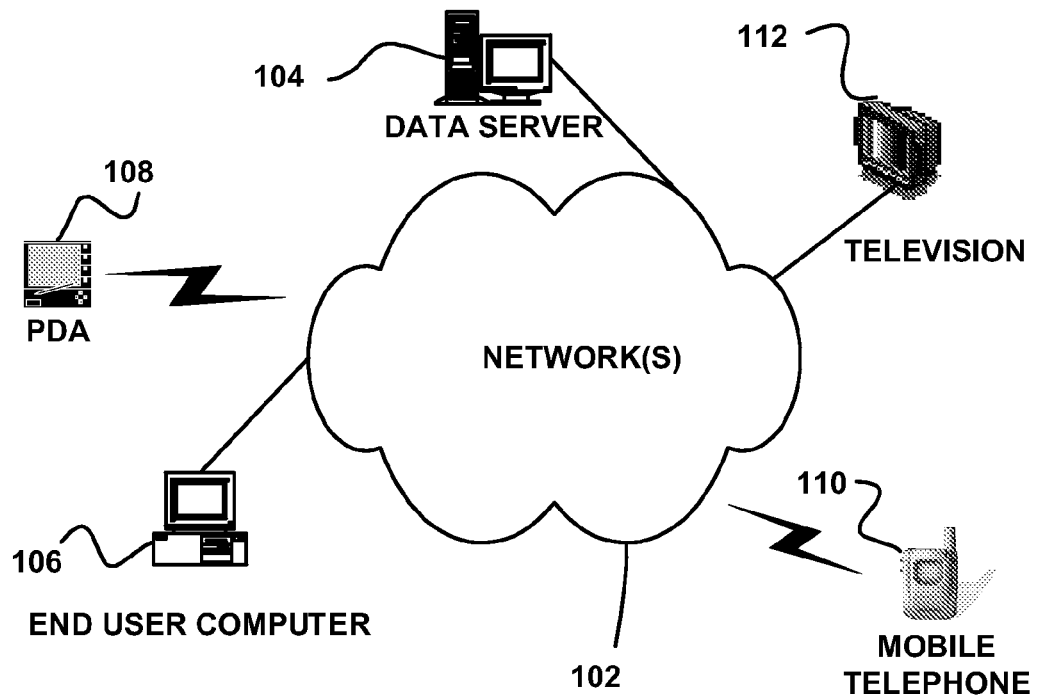
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be equipped with a database that has the capability of managing aging data. More information regarding such capability will be set forth hereinafter in greater detail during reference to subsequent figures.

Figure 2:
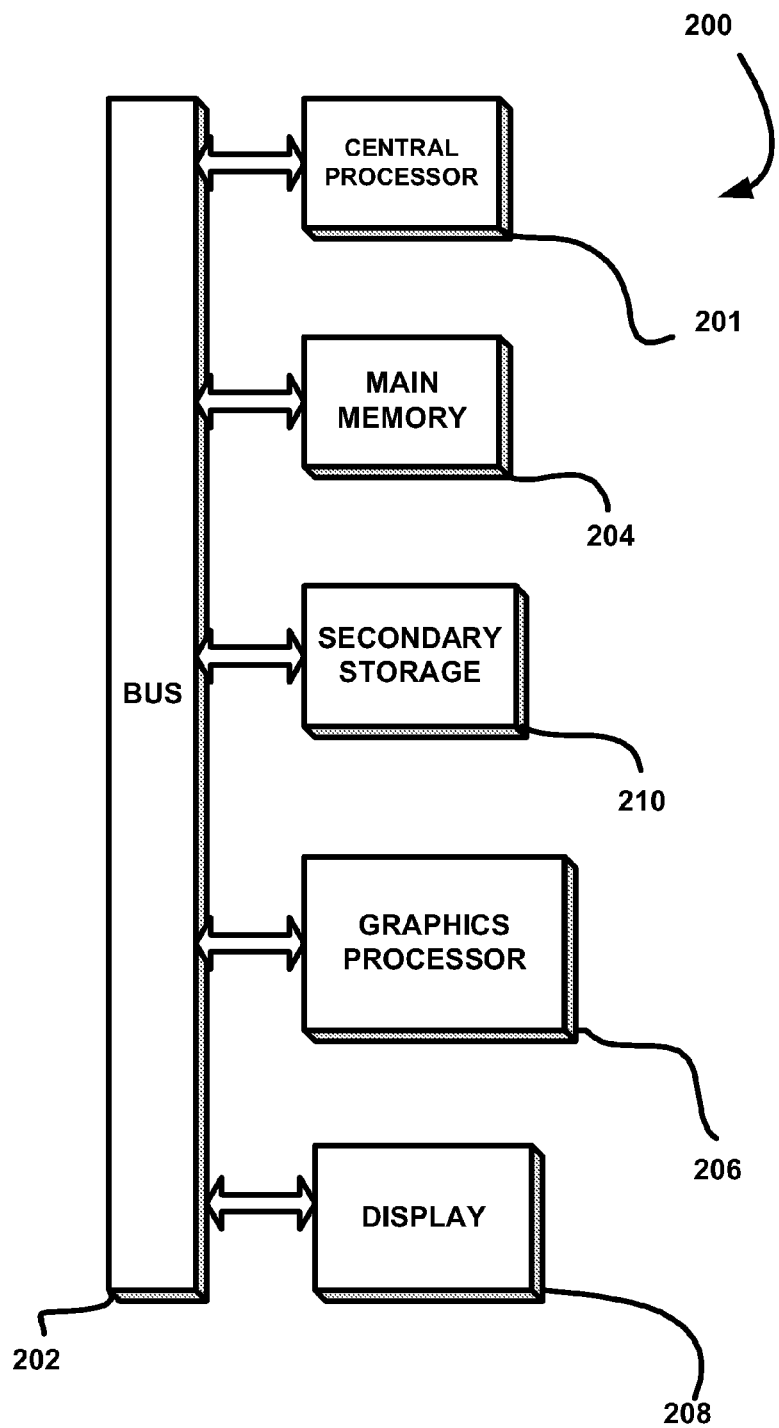
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
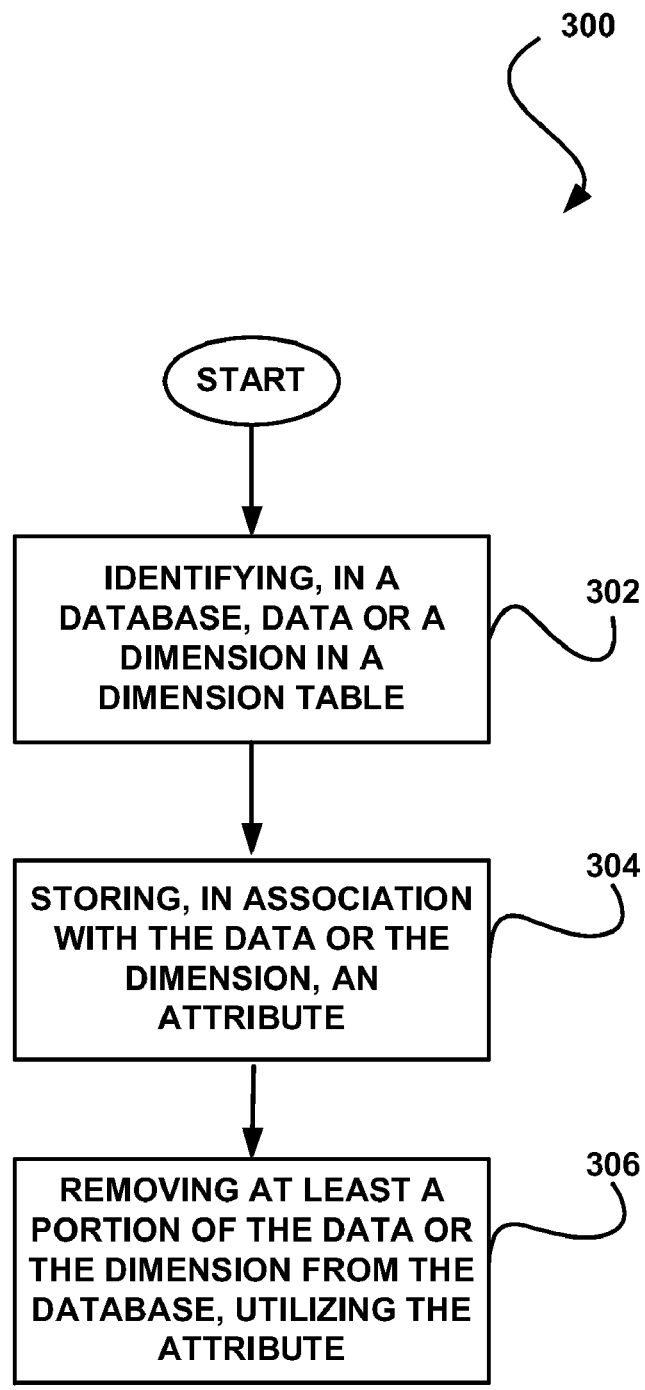
FIG. 3 shows a method for managing aging data, in accordance with one embodiment.

FIG. 3 shows a method 300 for managing aging data, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown, data, and/or a dimension in a dimension table, is identified in a database. See operation 302. In the context of the present description, such dimension may include any field of a dimension table which, in turn, may include a plurality of fields. In different embodiments, some examples of such dimensions include, but are not limited to time, place, person, and/or any thing, for that matter. Such field, in turn, may be populated by data. In various embodiments, examples of such data may include, but are not limited a value, name, detail, and/or anything that specifies a field value.

Of course, such dimension, the dimension table, and associated database may be designed in any desired known or tailored manner. Just by way of example, in one embodiment, the database may include a star schema database with appropriate organized dimension table(s), etc. Of course, in other embodiments, a snowflake data schemas as well as others are also contemplated. Still yet, it should be noted that various features disclosed herein may be implemented in any desired database system [e.g. On-Line Analytical Processing (OLAP) database system, etc.].

As shown in operation 304, an attribute is stored in association with the data, and/or the dimension. In the context of the present description, such attribute may include any information capable of facilitate the removal of at least a portion of the data or the dimension from the database. For example, in one embodiment, the attribute may include a counter (e.g. a decrementing counter, etc.). Further, in another embodiment, such attribute may take the form of a time-to-live (TTL) attribute. More information regarding such embodiments will be set forth in greater detail during reference to FIGS. 4 and 5, respectively.

To this end, at least a portion of the data or the dimension is removed from the database, utilizing the attribute. See operation 306. By this feature, aging data may be removed in a possibly more efficient manner. This removal, in turn, may help control the amount of data, number of dimensions, dimension table size, etc. that are currently managed in a database. Further, such removal may facilitate without necessarily reloading the associated database.

More illustrative information will now be set forth regarding various optional architectures and uses in which the foregoing method 300 may or may not be implemented, per the desires of the user. For example, the foregoing method 300 may carried out in the context of a database transaction. It should be strongly noted that the following information is set forth for illustrative purposes and should not be construed as limiting in any manner. Any of the following features may be optionally incorporated with or without the exclusion of other features described.

In one example of use, the foregoing attribute may be generated, modified, etc. each time a database transaction (e.g. logical unit of work, etc.) is carried out. Such database transaction may refer to any unit of interaction with a database management system or similar system that is treated independent of other transactions and is, in some embodiments, either entirely completed or aborted. In various embodiments, a database system may guarantee ACID properties (i.e. atomicity, consistency, isolation, and durability) for each transaction. In other embodiments, such properties may be relaxed for an increase in performance.

In terms of a non-limiting example, a database may be used to track car sales by a particular company. In the context of one illustrative database transaction, such company may sell a red car to Joe Smith at the company's California location in May 2006. In such example, a transaction may increment various dimensions. Table #1 below illustrates an exemplary dimension table, and the manner in which it may be incremented.

TABLE #1

| Customer |
| --- |
| .... |
| Joe Smith |
| .... |
| Car |
| .... |
| Red |
| .... |
| Geography |
| .... |
| California |
| .... |

TABLE #1-continued

| Time Period |
| --- |
| .... |
| May 2006 |

To accomplish this, a transaction may be initiated and various queries may be executed to populate the various fields shown hereinabove. Once the queries are complete, the transaction may be committed and the updates may be made visible (if the transaction is successful). If, however, one of the queries fails, either the entire transaction or just the failed query may be rolled back, etc.

In addition to the transaction and the associated entries, an additional attribute may be generated or modified for the purpose managing such data as it ages. Such attribute may be stored in the dimension table or in a separate location. Further, the attribute may be determined and/or saved in association with or separate from (e.g. before or after) the aforementioned transaction.

Still yet, the additional attribute may or may not be accompanied with a predetermined aging transaction that is capable of utilizing the attribute to remove the effects of the original transaction reflected in Table #1. For example, such aging transaction may include that shown in Table #2.

TABLE #2

| REMOVE_1 (Customer = Joe Smith; Car = Red; Geography = California; Time Period = May 2006) |
| --- |

It should be strongly noted that the foregoing aging transaction and associated attributes are set forth for illustrative purposes only and should not be construed as limiting in any manner. For example, the aging transaction may simply be the converse or opposite of adding the data. In such embodiment, a log of operations (and data) associated with the initial transaction may be stored so as to be undone in conjunction with the aging transaction. This log may be stored in conjunction with or separate from the data itself.

As additional examples, other embodiments are envisioned where the transactions include specific types of attributes such as a counter (e.g. a decrementing counter, etc.), a time-to-live (TTL) attribute, etc. More information regarding such embodiments will be set forth in greater detail during reference to FIGS. 4 and 5, respectively.

In different embodiments, the aging transaction of Table #2 may be trigged manually and/or automatically in any desired manner. For example, in one embodiment, one or more of the aging transactions may be manually triggered via a graphical user interface (GUI). Such GUI may, for example, allow an administrator to remove data on all car sales that occurred in 2006 or prior. See Table #3, for example.

TABLE #3

| TRIGGER REMOVE_ALL (Time Period <= 2006) |
| --- |

In the above example, such command may trigger the aging transaction of Table #2 as well as any others that meet the foregoing criteria.

Still yet, the aforementioned trigger may take place automatically at periodic intervals, such that a sliding window of data is maintained in the database. See Table #4, for example.

TABLE #4

DAILY PERIODIC TRIGGER REMOVE_ALL (Time Period <= Current Time − 2 Years)

In the example of Table #4 (where the aging instruction is triggered daily), a two year sliding window of data would be maintained in the database. To this end, data may be discarded gradually and gracefully in a manner that is similar, but opposite, as inserting the data.

As another example, the aging transactions may be triggered at a predetermined time. Such predetermined time may or may not be included with the stored transaction itself. See Table #5, for example.

TABLE #5

REMOVE_1 (Customer = Joe Smith; Car = Red; Geography = California; Time Period = May 2006, Trigger = May 2008)

Of course, such trigger date may be configured by an administrator and may or may not apply to different and/or all data transactions, as desired. In an additional example, the data may be removed as a function of when one or more dimensions have been last updated (or when created). In such embodiment, information on the last update/creation update may be stored with the other elements (as a dimension) or separately, as desired.

In additional varying embodiments, the aged data may not necessarily be removed completely but rather partially by reformatting, changing to a different level of granularity, etc. See Table #6, for example.

TABLE #6

REMOVE_AGGREG (Customer = *; Car = *; Geography = California; Source Time Period = Jan.-Dec. 2006, Destination Time Period = 2006, Trigger = May 2008), where *** = wildcard In the present example, a particular granularity (e.g. month-specific data) may be removed based on the attributes shown. By rolling up such data in this manner, the aged data is managed more effectively.

In still additional embodiments involving a large number of aging transactions, the transactions themselves may be grouped (e.g. aggregated, etc.) in any desired manner. Again, such aggregation may be manual or automatic in nature. Just by way of example, an administrator may choose to remove all sales in May 2006 that were made in California. See Table #7, for instance.

TABLE #7

AGGREGATED_REMOVE_ALL (Customer = *; Car = *; Geography = California; Time Period = May 2006), where *** = wildcard.

Of course, the format shown in Table #7 is set forth for illustrative purposes only and should not be construed as limiting in any manner, since any technique may be used where multiple aging transactions are aggregated (e.g. generating fewer transactions that accomplish the same effect, triggering multiple transactions at the same time with fewer trigger instructions, etc.). In still another embodiment, aging transactions may be automatically aggregated for efficiency purposes.

In even still additional embodiments, the aging transactions may be updated (even before they are triggered) for various purposes. For example, in the context of the above car sales example, if Joe Smith should return the car or any other data may change, the associated aging attribute and/or associated aging transaction may be updated as well. To this end, various interdependencies may be addressed over time such that, when the aging transaction is carried out, aged data is managed appropriately.

As mentioned previously, the foregoing features are optional and are not to be construed as limiting in any manner whatsoever. For example, the aging attribute may take any form and may further be used in any manner to effect aging data management. More information will now be set forth regarding additional examples of attributes and their use, in accordance with different embodiments which may or may not incorporate the features set forth hereinabove.

Figure 4:
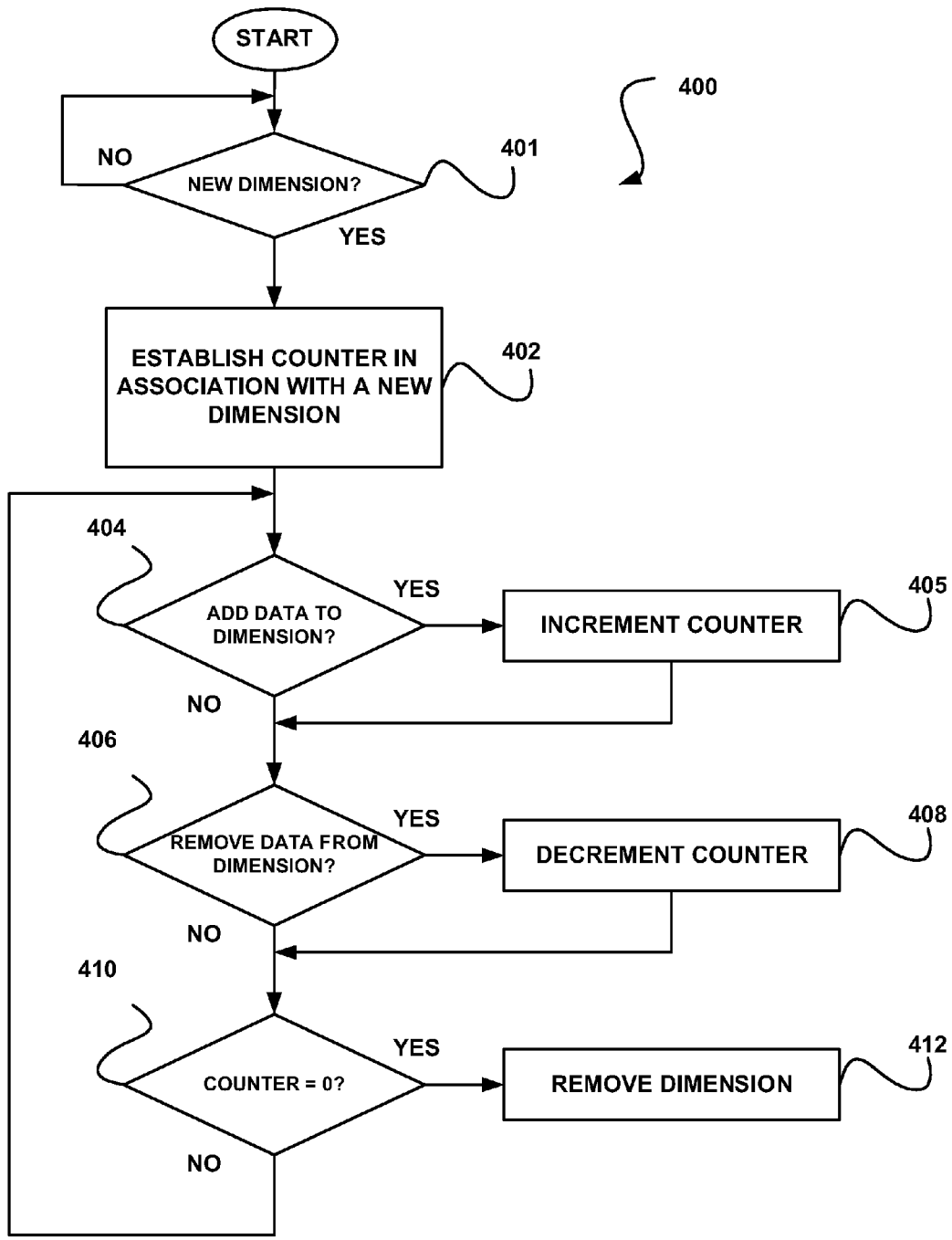
FIG. 4 shows a method for removing aging data, in accordance with another embodiment.

FIG. 4 shows a method 400 for removing aging data, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As shown, it is first determined whether a new dimension has been created. See decision 401. The decision 401 thus polls until such a new dimension has indeed been created.

If it is determined that the new dimension has been created per decision 401, an attribute in the form of a counter is established. For reasons that will soon become apparent, such counter may be associated with the particular counter that was created. This may be accomplished by any desired linking, pointer, etc. Examples of such association will be set forth in greater detail during reference to FIGS. 6A-6B.

Thus, in the present embodiment, the aforementioned attribute of FIG. 3 (here, in the form of a counter) is specifically associated with the dimension. Of course, however, the attribute may even be directly associated with the data itself, in other embodiments.

Next, it is determined whether any data has been added to the dimension. See decision 404. In response to data being added to the dimension, the counter may be incremented. Note operation 405.

Still yet, it is determined whether any data has been removed from the dimension. See decision 406. In response to data being removed from the dimension, the counter may be decremented. Note operation 408. By such incrementing and decrementing, the counter may be used to determine whether the dimension is ever empty.

Specifically, the counter may be continuously monitored to determine whether it is null (e.g. equal to zero, etc.). See decision 410. Such a state would indicate such a situation where the dimension has no data stored in association with it. Thus, upon the counter being null per decision 410, the dimension may simply be removed, thus helping to manage the number of dimensions, automate the removal of related data.

Figure 5:
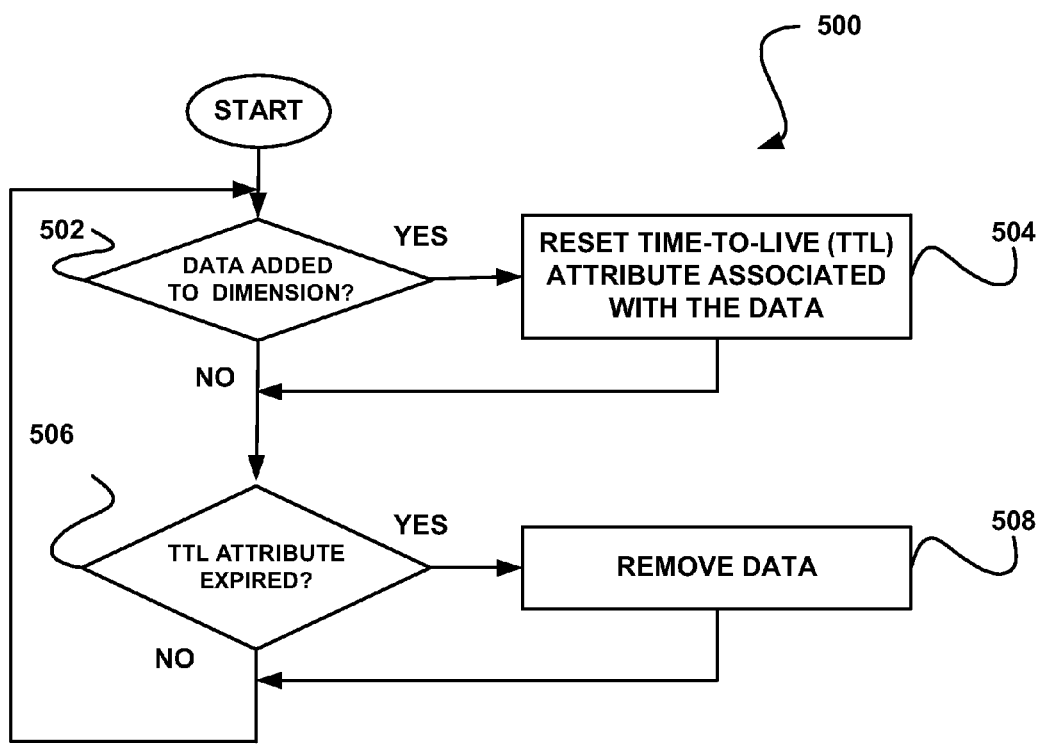
FIG. 5 shows a method for removing aging data, in accordance with still yet another embodiment.

FIG. 5 shows a method 500 for removing aging data, in accordance with still yet another embodiment. As an option, the method 400 may be implemented in the context of the details of FIGS. 1-3, and even FIG. 4. Of course, however, the method 400 may be carried out in any desired environment. Again, the aforementioned definitions may equally apply to the description below.

Similar to the previous embodiment, the aforementioned attribute of FIG. 3 (here, in the form of a TTL attribute) is specifically associated with each dimension of data. Of course, as mentioned earlier, the attribute may even be directly associated with the data itself, in other embodiments.

In the present embodiment, such TTL attribute may indicate a time in which the associated dimension will be expired.

In one aspect of the present embodiment, such TTL attribute may indicate a specific date. In another aspect of the present embodiment, the TTL attribute may identify a period of time (e.g. a number of weeks, months, years, etc.) after the associate dimension is to be expired. Of course, other timing schemes are also contemplated.

Thus, as data is changed (e.g. added, updated, modified, etc.) in the dimension per decision 602, the TTL may be reset. See operation 504. To this end, the timeframe in which the dimension is to expire may be augmented or prolonged as a function of data being changed. For example, in a situation where the TTL attribute indicates a timeframe of two months, resetting the TTL attribute within such two month period may continuously prolong the life of the dimension and associated data.

However, in response to the TTL attribute indicating that the associated dimension is expired per decision 506, the data (and even the dimension) may be removed. See operation 508. By this design, operation 508 may be put off or delayed as a function of operation 504. After the dimension has existed without data being changed, the dimension and associated data may expire. To this end, in one exemplary embodiment where the TTL attribute indicates a time window, such time window may be set such that, assuming that the dimension/data is not modified, touched, etc., it may be removed at the expiration of such timeframe.

Figure 6A:
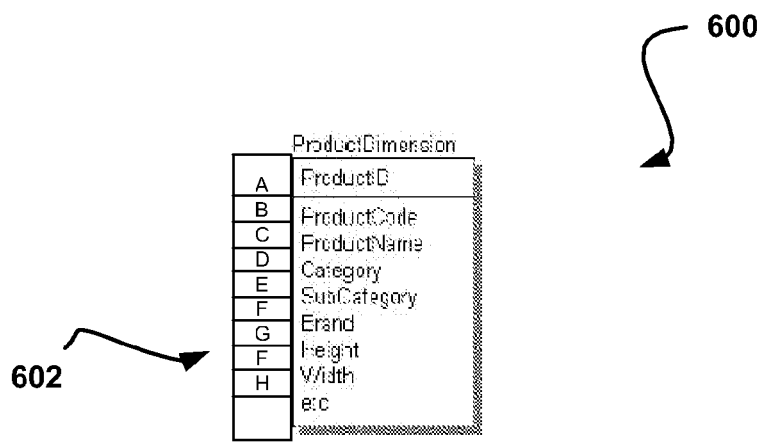
FIG. 6A shows a first data structure for facilitating the removal of aging data, in accordance with one embodiment.

FIG. 6A shows a first data structure 600 for facilitating the removal of aging data, in accordance with one embodiment. As an option, the data structure 600 may be used in the context of the details of FIGS. 1-5. Of course, however, the data structure 600 may be used in any desired environment. Again, the aforementioned definitions may equally apply to the description below.

As shown, a plurality of attributes 602 may be associated with each of a plurality of dimensions of a dimension table. To this end, any of the dimensions and/or associated data may be removed utilizing the associated attribute 602. Of course, this may be accomplished in any desired manner. See FIGS. 3-5, for example.

Figure 6B:
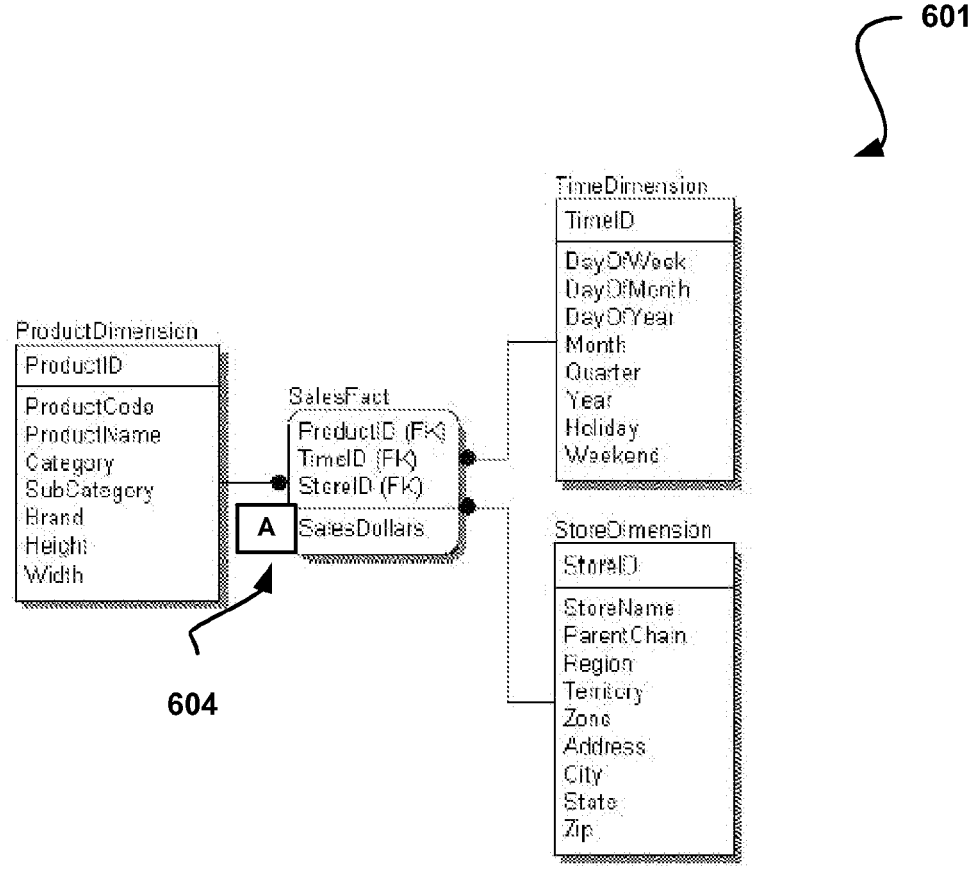
FIG. 6B shows a second data structure for facilitating the removal of aging data, in accordance with yet another embodiment.

FIG. 6B shows a second data structure 601 for facilitating the removal of aging data, in accordance with yet another embodiment. As an option, the data structure 601 may be used in the context of the details of FIGS. 1-5. Of course, however, the data structure 601 may be used in any desired environment. Again, the aforementioned definitions may equally apply to the description below.

As illustrated, an attribute 604 may be associated with a facto table, in the manner shown, such that, by virtue of such association, the attribute 604 may be associated with each of a plurality of dimensions associated with such fact table. To this end, any of the dimensions and/or associated data may be removed utilizing the associated attribute 604. Of course, this may be accomplished in any desired manner. See FIGS. 3-5, for example.

As various options with respect to any of the aforementioned figures, more complex rule-based logic may possibly be employed to accommodate different business needs, environments, etc. Just by way of example, different attributes may be associated with different types of dimensions/data, etc. Further, strictly as an option, various logic, business rules, etc. may be provide for automatically processing the dimensions/data before it is removed.

As mentioned earlier, instead of completely deleting a time dimension, only a portion of such dimension/data may be deleted such that, for example, the dimension/data is "rolled up" into a modified or different dimension. In one embodiment where the dimension is time, the rolled up data may simply be stored with less granularity. For instance, a month-based time dimension may be rolled up into a year-based time dimension, after a five year period has expired.

As set forth hereinabove, a log may be kept for each dimension/data that tracks any operations associated with the same. As an option, such log may be associated with (e.g. by way of link, pointer, etc.) the aforementioned aging attribute. Thus, at any time the aforementioned aging attribute indicates that removal of dimension/data is required, the aforementioned log may be used to "undo" any one or more of the aforementioned operations (and/or even any differences resulting from such operations). Just by way of example, if one of such operations impacted different dimension/data, this operation on such different dimension/data may be reversed, the differences removed, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying, in a database, a dimension in a dimension table of the database;
storing, in association with the dimension, an attribute;
removing at least a portion of the dimension from the database, utilizing the attribute; and
removing the dimension upon the attribute being null;
wherein the attribute includes a counter that is incremented in response to data being added to the dimension and decremented in response to data being removed from the dimension;
wherein the attribute is utilized to remove an effect of a previous transaction;
wherein the previous transaction includes adding data entries to a plurality of dimensions of the dimension table, and removing the effect of the previous transaction includes removing the data entries from the plurality of dimensions of the dimension table.

2. The method of claim 1, and further comprising determining whether a new dimension is created.

3. The method of claim 1, further comprising establishing the counter if it is determined that a new dimension is created.

4. A method, comprising:
identifying, in a database, a dimension in a dimension table of the database;
storing, in association with the dimension, an attribute;
removing at least a portion of the dimension from the database, utilizing the attribute; and
removing the dimension upon the attribute being null;
wherein the attribute includes a time-to-live attribute that is updated in response to data being changed in the dimension;
wherein the data is removed in response the attribute being expired;
wherein the attribute is utilized to remove an effect of a previous transaction;
wherein the previous transaction includes adding data entries to a plurality of dimensions of the dimension table, and removing the effect of the previous transaction includes removing the data entries from the plurality of dimensions of the dimension table.

5. The method of claim 1, wherein the dimension in a dimension table of the database is identified, and the attribute is stored in association with the dimension in the dimension table of the database.

6. The method of claim 1, wherein the database includes a star schema database.

7. The method of claim 1, wherein the database includes a snowflake schema database.

8. The method of claim 1, wherein the database includes an On-Line Analytical Processing (OLAP) database.

9. The method of claim 1, wherein the removing is carried out utilizing a database transaction.

10. The method of claim 9, wherein a plurality of the database transactions are aggregated.

11. The method of claim 9, wherein the database transaction is triggered manually.

12. The method of claim 9, wherein the database transaction is triggered automatically.

13. The method of claim 12, wherein the database transaction is triggered automatically at periodic intervals.

14. The method of claim 12, wherein the database transaction is triggered as a function of when at least one dimension is last updated.

15. A non-transitory computer readable medium encoded with a data structure, the data structure comprising:
   an attribute object stored, in association with a dimension in a dimension table of a database;
   where at least a portion of the dimension is capable of being removed from the database, utilizing the attribute object, and the dimension is removed from the database upon the attribute object being null;
   wherein the attribute object includes a counter that is capable of being incremented in response to data being added to the dimension and decremented in response to data being removed from the dimension;
   wherein the data structure is operable such that the attribute object is utilized to remove an effect of a previous transaction;
   wherein the previous transaction includes adding data entries to a plurality of dimensions of the dimension table, and removing the effect of the previous transaction includes removing the data entries from the plurality of dimensions of the dimension table.

16. A computer program product embodied on a non-transitory computer readable medium, comprising:
   computer code for identifying, in a database, a dimension in a dimension table of the database;
   computer code for storing, in association with the dimension, an attribute;
   computer code for removing at least a portion of the dimension from the database, utilizing the attribute; and
   computer code for removing the dimension upon the attribute being null;
   wherein the attribute includes a counter that is incremented by the computer program product in response to data being added to the dimension and decremented by the computer program product in response to data being removed from the dimension;
   wherein the computer program product is operable such that the attribute is utilized to remove an effect of a previous transaction;
   wherein the previous transaction includes adding data entries to a plurality of dimensions of the dimension table, and removing the effect of the previous transaction includes removing the data entries from the plurality of dimensions of the dimension table.

17. A system, comprising:
   memory for storing, in association with a dimension in a dimension table of a database, an attribute; and
   a processor in communication with the memory, the processor adapted for removing at least a portion of the dimension from the database, utilizing the attribute, and further adapted for removing the dimension upon the attribute being null;
   wherein the attribute object includes a counter that is incremented by the processor in response to data being added to the dimension and decremented by the processor in response to data being removed from the dimension;
   wherein the system is operable such that the attribute is utilized to remove an effect of a previous transaction;
   wherein the previous transaction includes adding data entries to a plurality of dimensions of the dimension table, and removing the effect of the previous transaction includes removing the data entries from the plurality of dimensions of the dimension table.

18. The system of claim 17, and further comprising a display communication with the processor and the memory via a bus.

19. The method of claim 1, wherein the at least a portion of the dimension is removed for controlling an amount of data in the database, a number of dimensions in the database, or a size of the dimension table.

20. The method of claim 1, wherein the attribute is continuously monitored to determine whether the attribute is null, and a determination that the attribute is null indicates a situation where the dimension has no data stored in association with the dimension, such that removing the dimension is utilized for managing a number of dimensions in the dimension table and automating a removal of related data.

* * * * *

UNITED STATES PATENT AND TRADEMARK OFFICE
CERTIFICATE OF CORRECTION

PATENT NO. : 8,160,997 B1
APPLICATION NO. : 11/739630
DATED : April 17, 2012
INVENTOR(S) : Tal Givoly Page 1 of 1

It is certified that error appears in the above-identified patent and that said Letters Patent is hereby corrected as shown below:

On the Title Page:

Assignee item (73); please replace "Amdoes Software System Limited" with --Amdocs Software Systems Limited--.

Signed and Sealed this
Thirty-first Day of July, 2012

David J. Kappos
*Director of the United States Patent and Trademark Office*